April 14, 1959   C. A. MOORE   2,882,045
CONTROL MECHANISM AND CIRCUIT FOR GARAGE DOORS AND THE LIKE
Filed March 12, 1956   3 Sheets-Sheet 1
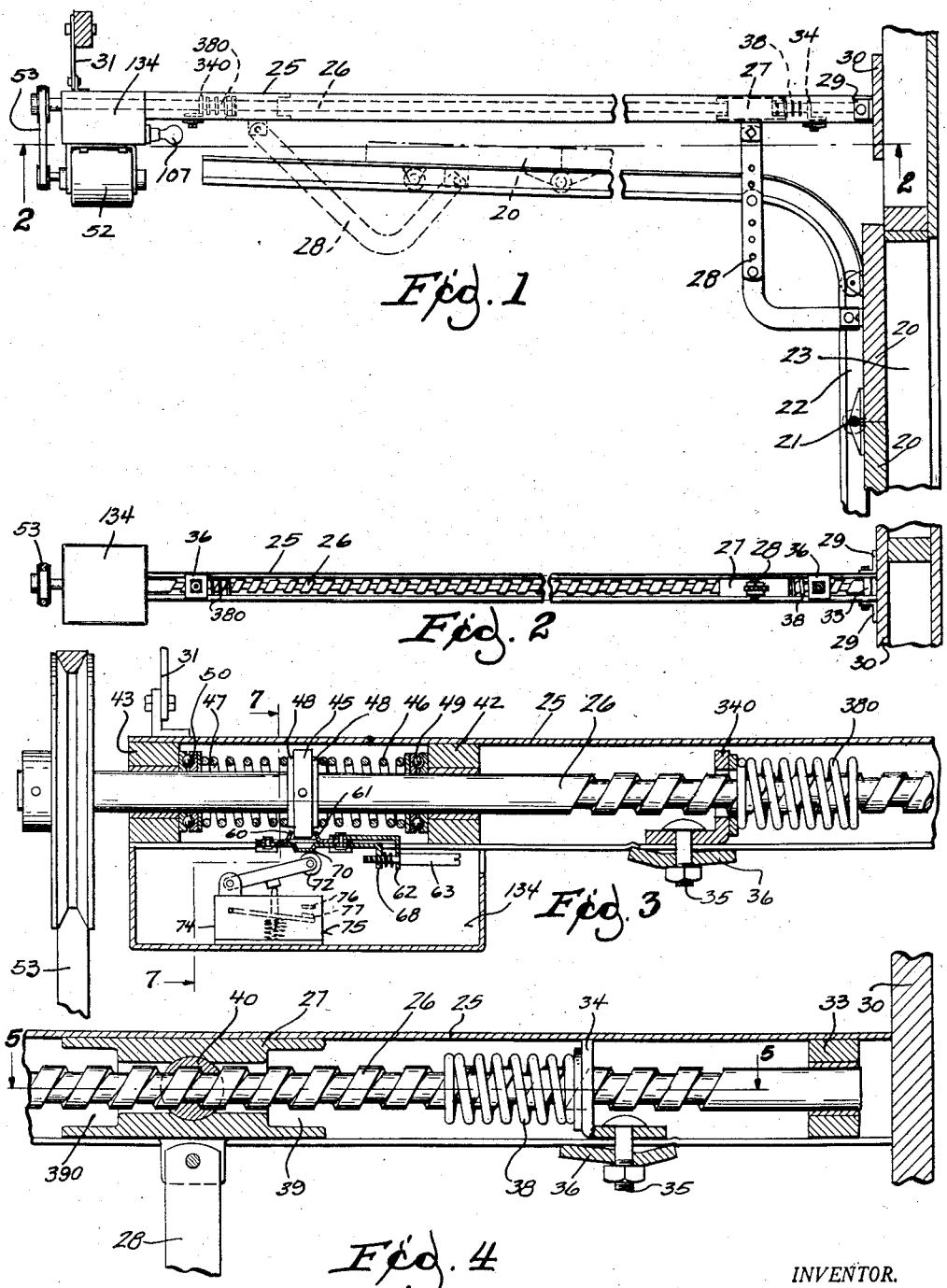
INVENTOR.
CLARK A. MOORE
BY
Wheeler, Wheeler & Wheeler
ATTORNEYS April 14, 1959          C. A. MOORE          2,882,045
CONTROL MECHANISM AND CIRCUIT FOR GARAGE DOORS AND THE LIKE
Filed March 12, 1956          3 Sheets-Sheet 2
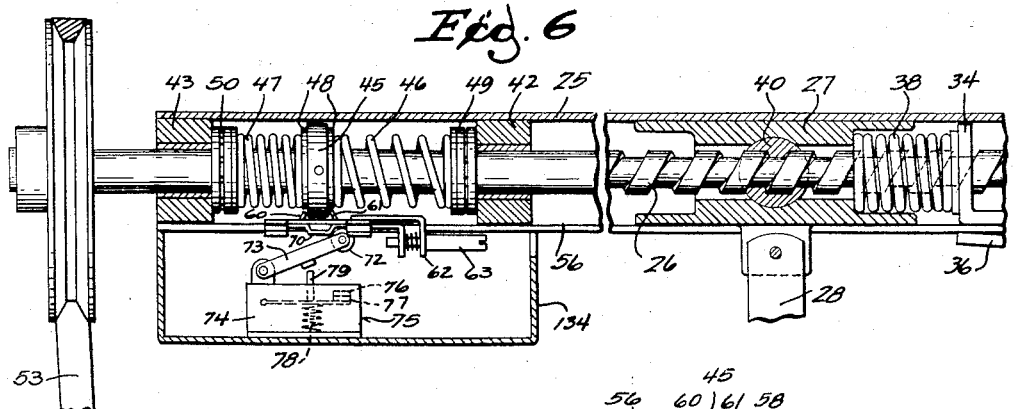
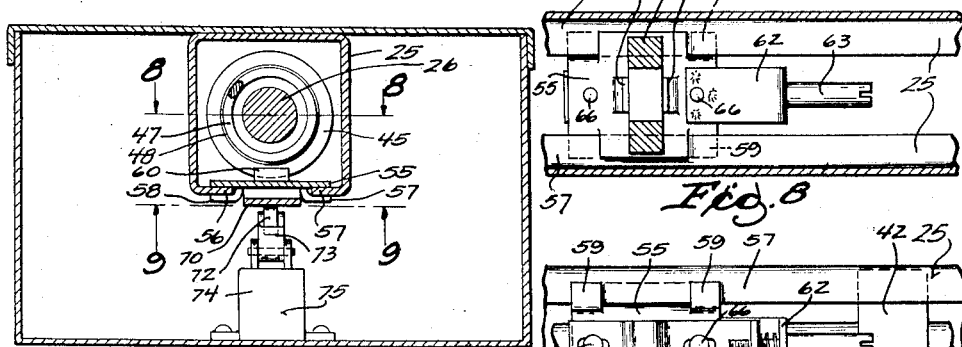
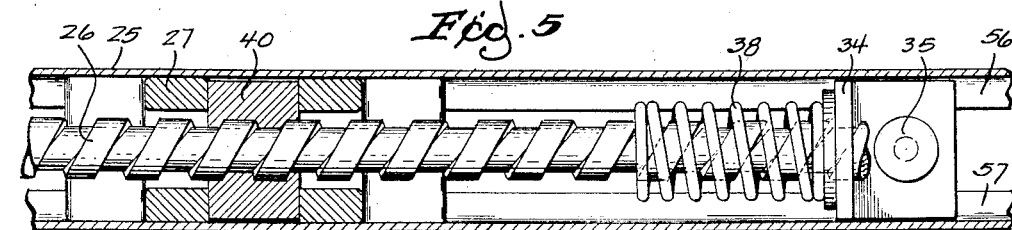
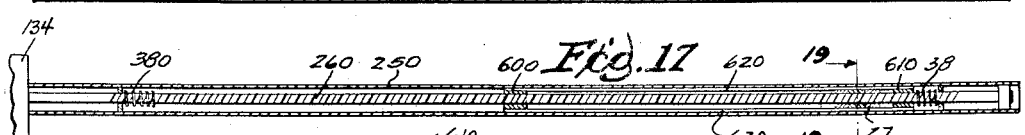
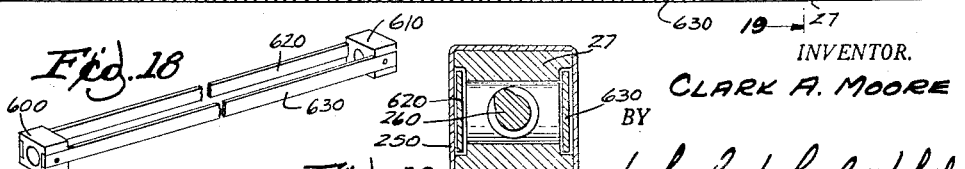
INVENTOR.
CLARK A. MOORE
BY
Wheeler, Wheeler Wheeler
ATTORNEYS April 14, 1959 C. A. MOORE 2,882,045
CONTROL MECHANISM AND CIRCUIT FOR GARAGE DOORS AND THE LIKE
Filed March 12, 1956 3 Sheets-Sheet 3
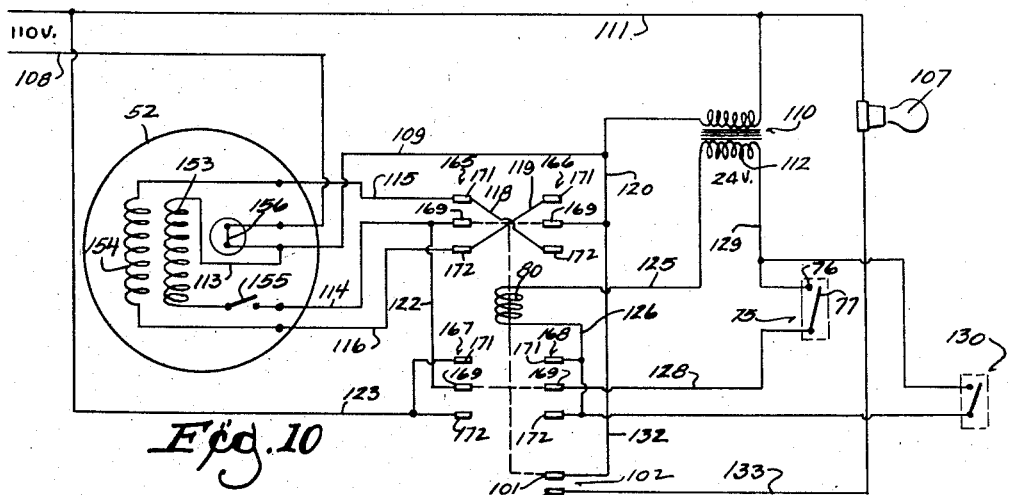
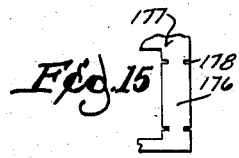
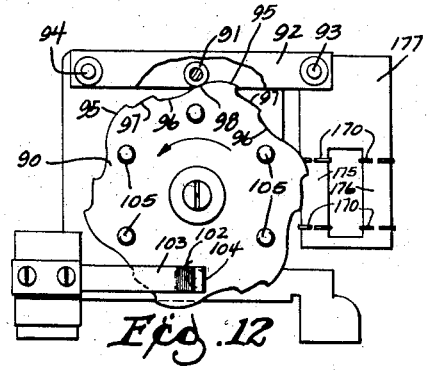
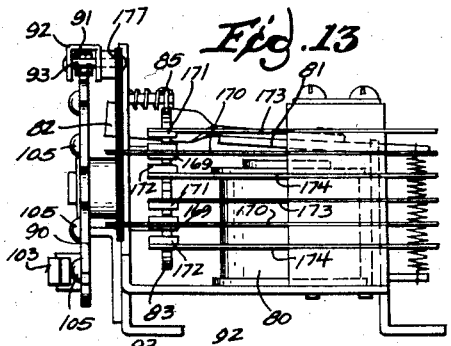
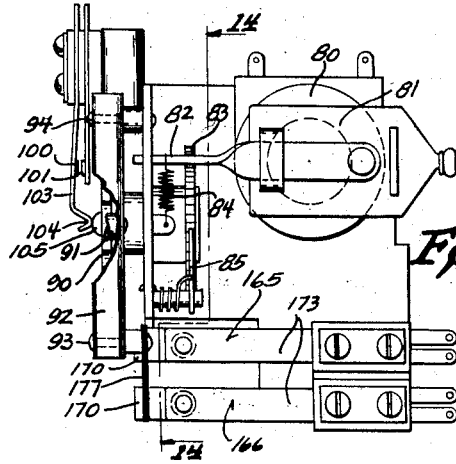
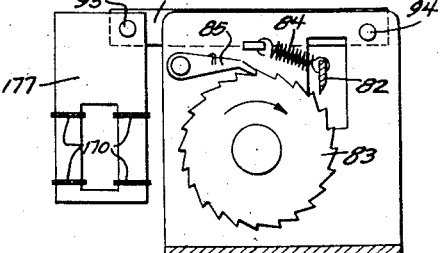
INVENTOR.
CLARK A. MOORE
BY
Wheeler, Wheeler & Wheeler
ATTORNEYS

United States Patent Office 2,882,045
Patented Apr. 14, 1959

2,882,045
CONTROL MECHANISM AND CIRCUIT FOR GARAGE DOORS AND THE LIKE

Clark A. Moore, Waupaca, Wis., assignor to A. E. Moore Company, Inc., Waupaca, Wis., a corporation of Wisconsin Application March 12, 1956, Serial No. 570,826

16 Claims. (Cl. 268—59)

This invention relates to a control mechanism and circuit particularly designed for garage door operation but useful anywhere that an operator is needed with a sensitively responding limit switch for arresting movement to prevent injury. An embodiment for garage door opening and closing is shown by way of exemplification.

A floating screw axially movable and centered by opposing springs reciprocates a trolley nut and slide connected to the door or other object requiring actuation. The trolley moves along a guideway between adjustable stops which determine its range of movement and upon reaching one extreme of movement or the other, or, alternatively, in the event that the actuated part strikes an obstruction, in either case, the screw is displaced axially to operate a relay which immediately stops the actuating motor and establishes a circuit such that upon the next operating signal the motor will reverse its direction of operation.

A separate slide having limited reciprocation parallel to the trolley slide has fingers engaging a collar connected with the screw so that displacement of the screw operates this second slide. The collar also serves as a seat abutted by the opposing springs which normally fix the axial position of the screw. The cam connected with the second slide is adjustable along the path of slide movement to vary the exact point at which it will interact with the cam follower which opens and closes a switch to energize the relay.

The relay is of special construction specifically designed for cooperation with mechanism above described. This coil operates a three-position cam by which multiple contacts are moved in the various cam positions. In the preferred embodiment shown, the cam is duplicated six times on the periphery of a disk having step-by-step advance by a pawl connected with the armature of the relay coil to the end that the cam advances from one position to the next every time the coil is energized. One of the three positions of the switch contacts is a neutral position.

In the drawings:

Fig. 1 fragmentarily illustrates a garage door and its casing in section and shows in side elevation the parts of the actuator which are connected respectively with the door and with the wall adjacent the casing.

Fig. 2 is a view taken in section on the line 2—2 of Fig. 1.

Fig. 3 is an enlarged detail view of one end of the actuator as it appears in axial section.

Fig. 4 is an enlarged detail view of the other end of the actuator as it appears in axial section.

Fig. 5 is a view taken in transverse section on the line 5—5 of Fig. 4.

Fig. 6 is a view similar to Fig. 3 but showing the screw displayed to actuate the limit switch.

Fig. 7 is a view taken on line 7—7 of Fig. 3 showing the parts on a further enlarged scale.

Fig. 8 is a view taken in section on line 8—8 of Fig. 7.

Fig. 9 is a view taken on line 9—9 of Fig. 7.

Fig. 10 is a circuit diagram.

Fig. 11 is a plan view of the specially designed relay regulating the operation of the control mechanism.

Fig. 12 is a view of the relay as viewed from the left side of Fig. 11.

Fig. 13 is a view of the relay as viewed from the bottom side of Fig. 11.

Fig. 14 is a detail view taken on the line 14—14 of Fig. 11.

Fig. 15 is a fragmentary elevational view of one of the legs of the movable contact carrier of the relay as it appears without having the contact springs interlocked therewith.

Fig. 16 is a fragmentary detail view in plan of the end of a contact spring formed for interlock with the contact carrier shown in Fig. 15.

Fig. 17 is a view in section of a special form of tubular housing and screw with yoked bearing supports employed when the screw is exceptionally long, the parts being shown on a greatly reduced scale.

Fig. 18 is a view on a somewhat enlarged scale as compared with Fig. 17 showing the yoked bearing supports for the elongated screw as they appear in perspective.

Fig. 19 is a view taken on a greatly enlarged scale on section 19—19 of Fig. 17.

In general, the application of the device to a garage and door is conventional. The door comprises sections 20, hingedly connected by hinges 21 and provided with rollers guided in track 22 which extends upwardly beside the door opening 23 and thence rearwardly along the ceiling.

Split tube 25 houses the door operating screw 26 and provides a way for the guidance of trolley slide 27 (Fig. 4), from which depends the adjustable arm 28 connected with the top section 20 of the door. The split tube 25 may conveniently be mounted by ears 29 from a mounting board 30 on the wall above the door, the remote end of tube 25 being supported by link 31 from a mounting on the ceiling.

Within the tube at the end nearest the wall over the door is a bearing 33 within which the unthreaded end of the screw is disposed for rotation and reciprocation. A short distance outwardly from the bearing, the screw passes through an opening in the adjustable stop 34 which has the form of an angle bracket clamped by means of bolt 35 and bent washer 36 to the split side of the tube 25 to be adjustable to any desired position along the tube. The bent form of the washer causes it to deform the tube sufficiently to preclude slippage when the nut is tightened on bolt 35. Fixed on the stop member 34 and projecting therefrom in a position in which it encircles the screw is a shock absorbing spring 38 receivable into a recess 39 in the end of the trolley 27.

The trolley nut desirably comprises cylinder 40 journaled for oscillation on a transverse axis of trolley slide 27 and pierced by a threaded hole, the threads of which mesh with those of the screw as best shown in Fig. 4 and Fig. 5.

An identical stop member 340 is adjustably clamped to the split tube 25 in the end thereof remote from the wall as clearly shown in Fig. 3. It supports a shock absorbing spring 380 receivable into the recess 390 of the trolley slide 27 when the slide is fed outwardly away from the door frame in a door-lifting direction.

The locations of the stop members 34 and 340 will determine the range of movement of the trolley slide and the door. As the trolley slide reaches either extreme of its range of movement, the compression developed in the spring 38 or 380 will bring about a corresponding reaction pressure axially of the screw 26 to displace the screw bodily.

When the split tube 250 and screw 260 are of great length, as in the case of many industrial installations in which doors of ten feet or more in height must be lifted, a pair of bearing blocks 600, 610 may be interposed between the trolley slide 27 and the springs 38, 380. The respective bearing blocks 600, 610 may be connected together by straps 620, 630 as shown in Figs. 17, 18 and 19. The length of straps 620, 630 may be approximately one-half of the range of travel of the trolley slide. As the trolley slide moves away from one extreme position toward the other, the bearing blocks 600, 610 will remain stationary until, at about the mid-point in said range, the trolley slide picks up the bearing block which has been supporting the center of the screw and moves that bearing block ahead of it toward the other extreme position of the trolley slide. At that position, the other bearing block is left substantially at the middle of the range of movement. Thus, there is no position of the parts in which there is more than one-half of the length of the screw 260 which is unsupported.

At the end of the split tube 25 remote from the doorframe, the screw 26 passes through a pair of spaced bearings 42 and 43 in which the screw is reciprocable as well as rotatable. A collar 45 pinned to the screw is confined between a pair of opposing compression springs 46 and 47 which bear against the washers 48 at opposite sides of the collar and, at their other ends, respectively seat against thrust bearings 49 and 50. These springs tend to keep the screw centered against axial displacement in either direction from the position shown in Fig. 3. At the same time, the arrangement is such that the screw may be axially displaced in either direction against the compression of the respective springs as the result of reaction developed when the trolley slide moving in the opposite direction encounters the appropriate stop. The screw is driven from motor 52 by means of belt 53 which accommodates axial displacement of the screw as shown in Fig. 6.

Motion of the screw axially in either direction from its center position of Fig. 3 brings about the corresponding movement of a cam slide shown in detail in Figs. 7, 8 and 9. In the device shown, the split tube 25 is square in cross section as shown in Fig. 7. The cam slide comprises a plate 55 riding on the inner surfaces of flanges 56 and 57 of the split tube and having offset tongues 58 and 59 respectively engaged beneath the outer surfaces of such flanges. The upstanding tongues 60 and 61 of the plate receive the collar 45 between them to permit relative rotation of the collar respecting the plate while constraining the plate to move axially of housing 25 with any axial displacement of screw 26.

Riveted or otherwise fastened to the plate is an arm 62 in which the adjusting screw 63 is rotatably mounted. The cam carrier 65 is adjustably supported on the underside of the plate by means of the headed pins 66 connected with the plate and for which the cam carrier 65 is provided with guide slots 67. The flange 68 of cam carrier 65 is in threaded engagement with the adjustment screw 63 and subject to the bias of the compression spring 64. Rotation of the screw will move cam carrier 65 for adjustment of the plate 55 in a direction longitudinally of the tube 25 and axially of screw 26.

Intermediate its ends, the cam carrier 65 is provided with a cam 70 which may be formed by an integral deformation of the plate as clearly shown in Figs. 6, 7 and 9. The purpose of the adjustment is to be able to control the sensitivity of the spots with which the cam will cause the limit switch to shut off the motor in the event the downward moving door encounters any obstacle or reaches the extreme of its movement in a downward direction. If comparable problems are encountered in the opposite direction of movement in some installation other than a garage door actuator, the cam carrier may be moved to the opposite side of the cam roller with which it coacts, the adjusting screw 63 accommodating such movement.

The cam 70 is engaged, when the parts are at rest, with a cam follower roller 72 carried by a lever 73 pivoted to the housing 74 of limit switch 75. This switch has a fixed contact at 76 and a movable contact 77 normally urged closed by compression spring 78. The contact actuator 79 is engaged by lever 73 to open the limit switch 75 when the roller 72 is displaced by cam 70. Inasmuch as the cam 70 will displace the follower roller 72 at all times when the parts are at rest or when the screw is in normal operation within the range of movement permitted slide 27, it follows that the self-closing limit switch 75 will ordinarily be open. However, upon any axial displacement of the screw which is sufficient to cause the cam 70 to clear the roller 72, the limit switch will close to stop the motor through the operation of the relay presently to be described.

The precise point at which the limit switch will close as shown in Fig. 6 will depend in part upon the extent of cam 70 axially of the screw, but it will also depend in part upon the adjustment of the cam so as to vary the relative position of the cam above the roller. Thus, with the screw collar 45 centered by springs 46 and 47 as shown in Fig. 3, it will be noted that the cam follower is at the extreme end of the available surface of cam 70 so that upon the slightest displacement of the cam to the left, consequent upon engagement of the door with any obstruction (or upon the slide 27 reaching stop 34 which it is approaching in Fig. 4), the screw 26 and its collar 45 will be displaced to the left and the limit switch will close as shown in Fig. 6.

The manner in which the limit switch regulates the operation is best shown by reference to sheet 3 of the drawings, Figs. 10 to 16.

The conventional motor 52 has a starting winding at 153 and a running winding 154. The motor is of the induction type and will operate in either direction according to the relative connections to these windings. The usual automatic cutout switch 155 is incorporated in the motor starting winding circuit, usually being opened centrifugally after the motor starts. Also incorporated in the motor conventionally is a thermostatic overload circuit breaking device 156. One of the features of the invention involves the powering of all control circuits through thermostatic circuit breaker 156 of the motor.

A special relay is used. This comprises pairs of double throw switches as diagrammatically shown in Fig. 10 and illustrated in Figs. 13 and 11.

Each of the switches 165, 166, 167 and 168 comprises a normally centered movable contact 169 supported on a spring 170 and upper and lower relatively fixed contacts 171, 172, respectively supported on springs 173, 174. The springs 170 which support the movable contacts 169 of the several switches are extended and mutually interlocked with the legs 175, 176 of the dielectric actuator 177. The ends of the springs and the side margins of the actuator have interlocking notches at 178 and 179 as separately illustrated in Figs. 15 and 16.

Thus the several movable contacts 169 are all operated concurrently into engagement with the respective upper contacts 171 or the respective lower contacts 172. It is noteworthy that there is also an intermediate position of the actuator and movable contacts in which all circuits controlled by the multiple switch are open.

Control is effected by means of coil 80, armature 81, pawl 82 mounted on the armature and ratchet 83 to which the pawl is held laterally by a tension spring 84 (Figs. 14 and 11). A separate pawl 85 engages the ratchet wheel 83 to preclude reverse movement thereof.

Wheel 83 is connected to a stepping cam 90, the lobes of which engage cam follower roller 91 of lever 92 to move the contact actuator 177 to which the end of the lever is pivoted at 93. The fulcrum of the lever is provided by a fixed pivot 94.

Each of the several lobes of the cam 90 has a high point at 95, a low point at 96 and two intermediate points at 97 and 98. When the roller 91 is engaged with the low points 96 of any lobe, the inherent bias of the springs 170, acting through the actuator 177 to hold the roller 91 to cam 90, will cause the respective movable contacts 169 to engage the lower relatively fixed contact 172 of the several switches 165, 166, 167, 168. In the respective intermediate positions 97, 98 of the respective lobes, the movable contacts 169 of the several switches will be open as shown in Figs. 10 and 13. As the cam rotates beneath cam follower roller 91 to engage such roller with the portion 95 of a particular lobe, the actuator 177 will be displaced to engage moving contacts 169 of the several switches with the relatively fixed upper contacts 171 thereof.

The stepping cam 90 may have as many lobes as may be desired. It has been convenient to use six lobes as shown, the cycle of operation being repeated six times in each rotation of the stepping cam 90.

The stepping cam may be made to perform an entirely separate function in the opening and closing of the relatively movable and fixed contacts 100 and 101 of switch 102 as best shown in Fig. 11. The movable contact 100 is carried on a spring 103 elbowed at 104 to engage cam buttons 105 positioned on the face of cam 90 at corresponding points respecting the several lobes. In the particular embodiment shown, this switch operates a lamp 107 which may illuminate the garage sufficiently to enable the operator to see his way to any desired point as, for example, the regular garage lighting system switch (not shown).

Referring to the wiring diagram, Fig. 10, the line conductor 108 is connected to the thermal overload switch 156 of the motor 52 and thence via conductor 109 to the primary of transformer 110 which is connected to the other line conductor 111. The transformer 110 has a secondary 112 which supplies reduced voltage (24 volts is satisfactory) to the coil 80 and the various switches 168 of the relay.

The output connection from the thermal overload switch 156 also leads to conductor 113 to the starting winding 153 of the motor 52. A return connection is provided through cutout switch 155 which opens, usually centrifugally, after the motor reaches running speed, closing whenever the motor stops or drops below running speed.

Through the cutout switch, when the latter is closed, the starting winding 153 is connected by conductor 114 with the movable contact 169 of switch 165. The contact 171 of switch 165 is connected by conductor 115 to one end of the running coil 154 of the motor, while the contact 172 of switch 165 is connected by means of conductor 116 with the opposite end of coil 154. Thus, depending on the position of the moving contact 169 of the switch 165, the starting coil 153 may be connected selectively with either end of the running coil 154 to start the motor in either direction.

It will further be observed that the stationary contacts of switches 165 and 166 are cross-connected, contact 171 of switch 165 being connected by conductor 118 to stationary contact 172 of switch 166, and stationary contact 172 of switch 165 being connected by conductor 119 with stationary contact 171 of switch 166. Since the moving contacts 169 of these switches move concurrently between their upper and lower positions, the closing of the starting circuit through contacts 169 and 171 of switch 165 will simultaneously establish a return circuit through contact 172 of switch 165 and contacts 171 and 169 of switch 166 to conductor 120 which leads through the primary of transformer 110 to the return side of the line at 111. In the depressed positions of contactors 169 of switches 165 and 166, the starting and running windings 153 and 154 are reversely connected to each other in circuit between the supply lines 108 and 111.

Switch 167 maintains the running winding 154 energized after starting winding 153 is cut out through the opening of switch 155. To this end, a conductor 122 extends from conductor 114 to the movable contact 169 of switch 167. Both the upper and lower contacts 171 and 172 of this switch are connected with conductor 123 which leads to the other side of the line at 111.

The secondary 112 of transformer 110 is connected by conductor 125 with the relay coil 80. The other side of this coil is connected by conductor 126 with the upper and lower contacts 171 and 172 of switch 168. The movable contact 169 of this switch is connected by conductor 128 with the limit switch 75 already described. It will be remembered that the movable contact 77 of this normally closed switch is cam operated away from engagement with its fixed contact 76. The follower 22 rides off of the cam 70 to allow the switch to close whenever the screw 26 is displaced axially in either direction. The precise amount of displacement required is adjustable by means of the screw 63 (Fig. 6) which adjusts the position of the cam lobe 70 respecting the cam follower roller 72 on the actuator or lever 73. When the switch 75 is closed, conductor 129 will complete the return circuit to the transformer secondary 112 which delivers an impulse to the coil 80 to achieve the advance of cam 90 for one step. The cam 90 rotates counter-clockwise as viewed in Fig. 12. Regardless of the position in which it has stopped, the impulse delivered to coil 80 will advance the cam one step. If the motor 52 has been in operation, this advance will cause it to cease operation. If the motor 52 has been at rest, this advance will cause the motor to start. The direction in which it will start will depend upon whether the follower roller 91 has been engaged with intermediate portions 97 or 98 of a given cam lobe.

A manual or radio-operated switch 130 is connected in parallel across the limit switch 75 so that impulses may come from this switch rather than from the limit switch. In ordinary operation, the functioning of these switches will alternate, the switch 130 usually providing the impulse which moves the cam to a position for initiating opening or closing operation and limit switch 75 usually providing the impulse for advancing the cam to an intermediate position to open the several switch contacts.

In the diagram, the lamp energizing switch 102 connects with conductor 120 by means of conductor 132 and connects with lamp 107 by means of conductor 133. The fixture location is, of course, optional. In practice, I may mount the lamp 107 directly on the housing 134 which encloses the limit switch and its cam.

Assuming that the door has been raised to the position fragmentarily shown in dotted lines in Fig. 1, engagement of the trolley with the spring 380 will have moved the screw 26 to the right as viewed in Fig. 3, until the cam 70 has cleared cam follower roller 72 resulting in the closing of switch 75 to deliver an impulse from the secondary of transformer 110 through the closed contact of switch 168 to the relay coil 80. Response of armature 81 causes pawl 82 to operate ratchet 83 and the stepping cam 90 to move the follower 91 from one extreme position to the intermediate position at which the parts will come to rest. Upon relief of driving pressure, the screw 26 will again be centered by spring 46 whereby cam 70 will engage roller 72 to open switch 75.

Upon the next energization of relay coil 80, which will then ordinarily be effected by closing switch 130, another impulse delivered to the armature will index the stepping cam 90 one more step, whereby the several switches 165, 166, 167, 168 will all be closed but in the opposite direction from that in which they were closed when the trolley was being moved from the full line position to the dotted line position of Fig. 1. Accordingly, the connection of the starting winding to the running winding of motor 52 will be reversed and the motor will actuate the screw 26 in the opposite direction, moving the trolley from left to right as viewed in Figs. 1 and 3 to 6. In the position of Fig. 6, the shock absorbing spring 38 has been compressed and the reaction on the screw 26 has moved the screw to the left thereby compressing the spring 47 and allowing roller 72 to drop from cam 70 to close switch 75. This will provide the requisite impulse which will advance the stepping cam 90 to its next position, which will be an intermediate position, again opening all circuits to the motor and allowing springs 47 to expand to restore the screw 26 to its normal position thereby reopening switch 75 and leaving the circuit in readiness for another operation.

It will be noted that the light 107 is energized by cam buttons 105 and switch 102 only in alternate operations of the feed screw. It is possible, however, by rapidly closing the limit switch 75 or the parallel manual switch 130, without giving time for the intervening screw operation, to turn the light on or off without opening or closing the door.

It will be observed that the action of the screw which operates the limit switch may be the result of any resistance to trolley movement and is not solely the result of the engagement of the trolley with one of the springs at the end of its stroke. If any object or person gets beneath the descending door, the resistance offered to the door when it encounters the object or person is sufficient to displace the screw slightly. The sensitivity of this response can be determined by adjusting the manually adjustable screw 63 (Figs. 3 and 6) so that the cam follower roller 72 may be poised, as in Fig. 3, at the very margin of the cam 70, from which it will drop to close switch 75 whenever there is the slightest resistance to downward movement of the door. Assuming the parts to be adjusted as shown in Fig. 3, there will obviously be differential response of the limit switch 75, the switch responding more sensitively in the descending direction of the door than in the ascending direction thereof.

As far as the rest of the mechanism is concerned, it is quite immaterial whether the starting winding of the motor be so connected as to raise the door when the relay switch is closed in an upward direction or whether motor be connected to operate to lower the door when the relay switches are connected to close in an upward direction. The stepping cam as shown in Fig. 12, is however, somewhat selective, having a sharper drop on the descending side of each lobe than on the ascending side thereof. The connections are desirably such that the follower roller 91 will drop rapidly from the peak of each cam lobe to the intermediate portion 97 thereof to stop the door in its descending movement.

By using the thermal overload switch with which the motor is already provided, I am able to protect the entire circuit without supplying any additional overload switch. It will be observed that not only the motor but all of the relay mechanisms are energized through the thermal overload switch 156 so that if and when this switch cuts out, the entire circuit is dead until the thermal overload switch cools.

The mechanism is extremely simple and extremely effective and foolproof in operation.

I claim:

1. In a device of the character described, the combination with means providing a way, of a trolley slide reciprocable along the way and provided with a nut, a screw extending along the way and meshing with the nut, bearing means in which the screw is mounted for rotation and limited axial reciprocation, spring thrust receiving means separate from the trolley slide and connected in thrust relation to the screw, spring means in thrust engagement with the spring thrust receiving means to bias the screw to an intermediate position from which it may be displaced axially in either direction, a motor connected with the screw for the operation thereof, an actuated part connected with the trolley to be actuated thereby in the movement of the trolley along the way resulting from the interaction of the screw and the trolley nut, trolley slide limit means fixed to the way in the path of trolley slide movement, a motor control switch, and means for transmitting axial motion of the screw to open the switch, the switch being opened to arrest screw rotation whenever the screw is displaced either because of trolley engagement with said limit means in normal operation or because of abnormal resistance to trolley movement at any other point.

2. The device of claim 1 in which said spring thrust receiving means has shoulder means, the switch actuating means comprising a cam and fingers connected with the cam and embracing said shoulder means to accommodate rotative movement of the shoulder means with the screw while responding to axial displacement of the shoulder means with the screw.

3. In a device of the character described, the combination with means providing a way, of a trolley slide reciprocable along the way and provided with a nut, a screw extending along the way and meshing with the nut, bearing means in which the screw is mounted for rotation and limited axial reciprocation, spring thrust receiving means separate from the trolley slide and connected in thrust relation to the screw, spring means in thrust engagement with the spring thrust receiving means to bias the screw to an intermediate position from which it may be displaced axially in either direction, a motor connected with the screw for the operation thereof, an actuated part connected with the trolley to be actuated thereby in the movement of the trolley along the way resulting from the interaction of the screw and the trolley nut, trolley slide stop means fixed in the path of trolley slide movement, a motor control switch, and means for actuating the control switch upon axial displacement of the screw responsive to reaction developed by said stop means to movement of the trolley slide, the means for actuating the control switch comprising an electrical relay, an operating circuit and a switch controlling the operating circuit and provided with a movable contactor, a cam, means connecting the cam to the screw, a cam follower connected with the actuator and engaged with the cam in the undisplaced position of the screw to maintain said switch open in said position.

4. In a device of the character described, the combination with means providing a way, of a trolley slide reciprocable along the way and provided with a nut, a screw extending along the way and meshing with the nut, bearing means in which the screw is mounted for rotation and limited axial reciprocation, spring thrust receiving means separate from the trolley slide and connected in thrust relation to the screw, spring means in thrust engagement with the spring thrust receiving means to bias the screw to an intermediate position from which it may be displaced axially in either direction, a motor connected with the screw for the operation thereof, an actuated part connected with the trolley to be actuated thereby in the movement of the trolley along the way resulting from the interaction of the screw and the trolley nut, trolley slide stop means fixed in the path of trolley slide movement, a motor control switch, and means for actuating the control switch upon axial displacement of the screw responsive to reaction developed by said stop means to movement of the trolley slide, said switch-actuating means comprising a cam-carrying slide reciprocable along the way, a cam adjustably mounted on the slide for movement respecting the slide in a direction generally parallel to the extent of the screw, a cam follower in the path of movement of the cam with the slide, said follower having a switch-actuating connection, and means connecting the cam slide with the said flange of the screw for the actuation of the cam slide upon axial displacement of the screw.

5. The device of claim 1 in which the way comprises a split tube, said stop means being adjustable longitudinally of the split tube and comprising an abutment within the tube, a bolt connected to the abutment and projecting through the split in the tube and a clamp plate externally of the tube spanning across the tube split and means threaded to the bolt for imposing clamping pressure against the plate and tube, said clamp plate having a sharp edge adapted to interlock with the tube.

6. In a device of the character described, the combination with means providing a way, of a trolley slide reciprocable along the way and provided with a nut, a screw extending along the way and meshing with the nut, bearing means in which the screw is mounted for rotation and limited axial reciprocation, spring thrust receiving means separate from the trolley slide and connected in thrust relation to the screw, spring means in thrust engagement with the spring thrust receiving means to bias the screw to an intermediate position from which it may be displaced axially in either direction, a motor connected with the screw for the operation thereof, an actuated part connected with the trolley to be actuated thereby in the movement of the trolley along the way resulting from the interaction of the screw and the trolley nut, trolley slide stop means fixed in the path of trolley slide movement, a motor control switch, and means for actuating the control switch upon axial displacement of the screw responsive to reaction developed by said stop means to movement of the trolley slide, said way being provided with bearing slides disposed intermediate the trolley slide and with bearings for the screw at the ends of the way, the bearing slides having links connecting them with each other at a spacing half of the range of movement of the troley slide and being disposed in the path of the trolley slide to be engaged by the trolley slide and moved thereby in the course of trolley slide movement.

7. In a device of the character described, the combination with means providing a way, of a trolley slide reciprocable along the way and provided with a nut, a screw extending along the way and meshing with the nut, bearing means in which the screw is mounted for rotation and limited axial reciprocation, spring thrust receiving means separate from the trolley slide and connected in thrust relation to the screw, spring means in thrust engagement with the spring thrust receiving means to bias the screw to an intermediate position from which it may be displaced axially in either direction, a motor connected with the screw for the operation thereof, an actuated part connected with the trolley to be actuated thereby in the movement of the trolley along the way resulting from the interaction of the screw and the trolley nut, trolley slide stop means fixed in the path of trolley slide movement, a motor control switch, and means for actuating the control switch upon axial displacement of the screw responsive to reaction developed by said stop means to movement of the trolley slide, said spring thrust receiving means of the screw comprising shoulder means disposed adjacent one end of the screw, thrust bearings encircling the screw adjacent the shouldered means, the opposed springs comprising compression springs confined between said thrust bearings and the said shouldered means, a cam slide mounted for reciprocation along the way and having fingers engaged with the shouldered means whereby said cam slide is constrained to partake of the axial movement of the shouldered means and the screw, a cam on the cam slide, a cam follower with which the cam is normally engaged in the said intermediate position of the screw, said cam follower having a support constituting switch actuating means, and a switch actuated by said actuating means and having electrical connections for the operation of the control switch as a part of the said means for opening the control switch upon axial displacement of the screw.

8. The device of claim 7 in which the means for opening the control switch further includes a stepping relay having a coil in circuit with the switch operated by said actuator, a stepping cam provided with a ratchet and an actuating pawl, an armature associated with the coil and connected with the pawl for the stepping advance of said last mentioned cam, said control switch comprising relay contacts having actuating means connected for oscillation by said stepping cam.

9. In a device of the character described, the combination with a trolley way and trolley, of a screw extending along said way and for which said trolley is provided with a nut, bearings mounting said screw for rotation and limited axial reciprocation, spring means for maintaining the screw normally in a position from which it is subject to axial displacement, a motor connected with the screw for rotation thereof, a part connected with the trolley to be actuated thereby, a first switch having an actuator connected to be operated upon the axial displacement of the screw, a relay having a coil connected with the first switch to be controlled as to energization by said first switch, said relay being provided with switch contacts operatively connected for control of the motor, the motor being reversible and the relay contact having circuits for the actuation of the motor in opposite directions, and an armature operatively associated with the relay coil and including means for the stepping movement of the relay contacts through a cycle which includes the alternate operation of the motor in opposite directions with intervening intervals of dwell.

10. The device of claim 9 in which the relay comprises a plurality of switches each provided with relatively fixed and movable contacts, a common actuator for the several movable contacts, a stepping cam having a ratchet and a pawl engaged with the ratchet and connected with the relay armature, said cam including a succession of lobes each including a low point, an intermediate point, a high point and an intermediate point, and cooperating cam follower means connected with said common actuator for the advance of the cam lobe to position the said points sequentially in engagement with the follower, each of the high and low points closing a motor-operating circuit to actuate the motor in one direction or the other and each of said intermediate points representing a position in which the movable contacts of the several switches are open and the motor is inactive.

11. In a control mechanism device, the combination with a screw mounted for rotation and reciprocation, a trolley having a nut meshing with the screw, means providing a way in which the trolley is guided, an operating connection leading from the trolley, a reversible motor in driving connection with the screw, a motor circuit including a relay having a control coil and a gang switch, said switch including moving contact means having a forward driving position, a reverse driving position and open circuit positions respecting said motor and its circuit, means for actuating the moving contact means in a cycle including both of said driving positions with an intermediate dwell in the open circuit positions in advance of its movement to each of said driving positions, and two separate switches in parallel for energizing said relay coil, one of which switches is provided with an actuator connected to said screw to energize said coil upon each displacement of said screw axially, the other of said parallel switches being dependent upon conscious manipulation for its closing.

12. The device of claim 11 in which the motor is provided wtih a thermal overload cutout through which said relay is energized.

13. The device of claim 11 in which the relay comprises an armature having a pawl connected thereto and the common actuator for the moving contact means of said gang switch has a cam follower lever connected therewith, a ratchet with which the pawl coacts, the multiple lobes of the cam being connected with the ratchet for step-by-step advance, each lobe including at least four points of dwell including a low point, a high point and intermediate points intervening between each high point and each low point, a cam follower connected with the lever and engaged with the lobe cam to dwell at said intermediate, high, intermediate, and low points sequentially in the course of the step-by-step advance of the cam by said pawl.

14. In a device of the character described, means providing a way, a trolley reciprocable along the way and provided with a nut, screw means extending along the way and meshing with the nut, bearing means in which the screw means is mounted for rotation and limited axial reciprocation, a motor connected to the screw means for the operation thereof, spring thrust receiving means on said screw means, motor control means including a switch actuated by axial movement of said screw means, trolley slide stops fixed respecting the way and spaced at opposite ends of trolley slide travel, spring seats spaced at opposite sides of said spring thrust receiving means, a first set of coil springs coaxial with said screw means and bearing on said seats and on said spring thrust receiving means to center said screw means respecting its axial movement, and a second set of coil springs coaxial with said screw means and disposed between said trolley slide and said stops, said first and second spring sets cooperating in transmitting the reaction thrust of said trolley slide against said stops to said spring thrust receiving means for appropriate actuation of said switch.

15. In a device of the character described, means providing a way, a trolley reciprocably movable along the way and provided with a nut, screw means extending along the way and meshing with the nut, bearing means near the ends of the screw means in which the screw means is mounted for rotation, said way being provided with screw bearing slides at opposite sides of the trolley and having bearing portions in which said screw means is rotatable, said bearing slides having links interconnecting them in spaced relation.

16. In a device of the character described, the combination of a screw and bearings in which the screw is mounted for rotation and for axial displacement, a motor having rotative driving connection with said screw, drive-interrupting means for arresting the drive to the screw, means biasing the screw against axial displacement, a nut meshing with the screw and having feed movement axially thereof, means for transmitting axial motion of said screw to said drive-interrupting means for the interruption of drive to said screw upon axial displacement of said screw both in limiting normal nut feed and in emergency due to excessive resistance to nut movement, and a fixed stop disposed in the path of nut movement and with respect to which the screw is displaceable axially, said stop thereby causing the actuation of said drive-interrupting means at the limit of normal nut feed.

References Cited in the file of this patent

UNITED STATES PATENTS

| | | |
|---|---|---|
| 1,942,712 | Kirsch | Jan. 9, 1934 |
| 1,969,926 | Eickhoff | Aug. 14, 1934 |
| 2,095,688 | Ballentine | Oct. 12, 1937 |
| 2,253,170 | Dunham | Aug. 19, 1941 |
| 2,496,094 | Johnson | Jan. 31, 1950 |
| 2,504,408 | Griffin | Apr. 18, 1950 |
| 2,676,294 | Wilcox | Apr. 20, 1954 |